United States Patent

[11] 3,576,199

[72] Inventors Adolf Schoepe
1620 N. Raymond Ave., Fullerton, Calif. 92631;
Fredric E. Schmuck, 535 Century Drive, Anaheim, Calif. 92805

[21] Appl. No. 811,293
[22] Filed Mar. 28, 1969
[45] Patented Apr. 27, 1971

[54] ANTI-CORROSION BALL COCK FLUID FLOW CONTROL ASSEMBLY
4 Claims, 5 Drawing Figs.

[52] U.S. Cl. .......... 137/414, 137/437, 137/441, 137/550, 4/41
[51] Int. Cl. .......... E03d 1/32, F16k 31/34
[50] Field of Search .......... 137/436, 437, 414, 441, 550; 138/42; 4/41

[56] References Cited
UNITED STATES PATENTS

| | | | |
|---|---|---|---|
| 2,532,973 | 12/1950 | Wallentin | 138/42X |
| 2,770,250 | 11/1956 | Smith | 137/437X |
| 2,779,350 | 1/1957 | Owens | 137/436X |
| 3,194,258 | 7/1965 | Grant | 137/414 |
| 3,414,005 | 12/1968 | Fulton | 137/436 |

*Primary Examiner*—Alan Cohan
*Attorney*—Mahoney, Hornbaker and Schick

ABSTRACT: A molded plastic unitary water flow director forms a water outlet portion having a part of a valve lower housing portion as an upward extension thereof and telescoping a water inlet portion extending centrally into the lower housing portion. A valve seat is formed at an end of the inlet portion and a water outlet chamber is formed between the inlet and outlet portions opening upwardly into the lower housing portion adjacent the valve seat. A separate plastic filtering member is inserted downwardly into the water chamber receiving water from over the valve seat into a filtering chamber thereof and filtering said water outwardly into said outlet chamber with a portion thereof passing directly outwardly through a refill hose nipple and the remainder passing circuitously downwardly through and outwardly of said water chamber into the interior of a water tank. An upper annular edge of the filtering member clamps an annular zone of a resilient sealing member within the valve formed by said lower housing portion and an enclosing upper housing portion, the sealing member within the housing portions being float controlled for movement and in turn controlling the flow of water over the valve seat.

INVENTORS
ADOLF SCHOEPE,
FREDRIC E. SCHMUCK
BY
MAHONEY, HORNBAKER
& SCHICK
ATTORNEYS

INVENTORS
ADOLF SCHOEPE,
FREDRIC E. SCHMUCK
BY

MAHONEY, HORNBAKER
& SCHICK
ATTORNEYS

ANTI-CORROSION BALL COCK FLUID FLOW CONTROL ASSEMBLY

CROSS-REFERENCE TO RELATED APPLICATION

This invention is an improvement on the invention disclosed and claimed in our prior U.S. Pat. No. 3,429,333, issued Feb. 25, 1969, entitled, "Ball Cock."

BACKGROUND OF THE INVENTION

This invention relates to an improved anticorrosion ball cock fluid flow control assembly used for controlling the flow of water into and the water level within a water tank or flush tank. More particularly, this invention relates to an improved ball cock fluid flow control assembly which may be formed having virtually optimum anticorrosion characteristics which may be incorporated in a ball cock installed for controlling the flow of relatively corrosive liquids such as sea water and the like. Furthermore, the ball cock fluid flow control assembly of the present invention may be provided with the foregoing anticorrosion attributes, yet of a greatly simplified form and with a reduction in noise of the liquids flowing therethrough and controlled thereby.

In the ball cock of our said prior U.S. Pat. No. 3,429,333, a metal water inlet member extends upwardly through the bottom wall of a water or flush tank into the tank interior and the upper end thereof is telescopically assembled with the metal lower half of a valve housing. Also, a tubular plastic water outlet member is telescoped over the inlet member beneath the valve housing lower half forming with the inlet member a water outlet chamber communicating outwardly into the tank interior and also with a refill hose. A plastic upper half of the valve housing is assembled with the lower half thereof and encloses a resilient sealing member controlling the inlet flow of water over a valve seat in the housing lower half between the inlet member and the outlet chamber, the sealing member movement thereby controlling the flow of water into the water tank.

Still further according to our prior U.S. Pat. No. 3,429,333, an upright guide or mast is formed integrally on the valve housing upper half extending upwardly therefrom and vertically slidably mounting a water level control float. The float is operably connected through a connecting arm to an operating lever of the valve so that movement of the float downwardly opens said valve permitting the inflow of water into the tank and float upward movement closes the valve by moving the sealing member against the valve seat blocking water flow into the tank. When the water is flowing through the assembly into the tank, a portion thereof is directed from the water chamber into the refill hose, said refill hose extending upwardly and depositing the water into the upper end of a refill tube.

In the particulars of configuration of the water outlet member for this prior ball cock construction, a series of spaced fingers are formed in the water chamber thereof adjacent the outlet to the refill hose with the portion of water flow passing from the outlet chamber to the refill hose being filtered therethrough. In addition, an annular series of spaced slots are formed in the outlet member within the outlet chamber in the path of flow of said water through said outlet chamber and outwardly to the tank interior, again filtering the water prior to entering the tank interior. As a result, a portion of the water entering the outlet chamber passes through the filtering fingers into the refill hose and the remainder of such water passes through the filtering slots, circuitously downwardly within the outlet member and around the outer side of the inlet member, and ultimately outwardly through a series of outlet member openings into the tank interior.

Not only does this double filtering outlet member configuration require relatively complex part-molding techniques, but the overall multiple part flowing control assembly requires a somewhat complicated production assembly operation wherein alignments are critical. Also, due to the fact that the water inlet member and the valve housing lower half are formed of metal, some noise of water flow is encountered despite the fact that the water is directed circuitously through the water outlet member for a reduction of such fluid noise. Still additionally, and extremely important where relatively corrosive waters are involved such as sea water and the like, the metal formation of the water inlet member and valve lower housing have presented some corrosion problems.

OBJECTS AND SUMMARY OF THE INVENTION

It is, therefore, an object of this invention to provide an anticorrosion ball cock fluid flow control assembly wherein all of the main parts thereof are formed of a corrosion-resistant plastic with the exception of the sealing member which is formed of a corrosion-resistant resilient material. As a result thereof, attack from corrosive waters is virtually eliminated so that the control assembly is adapted for handling such waters as sea water and the like. Also, with the use of plastic nearly exclusively in the flow control assembly, a large portion thereof may be produced by a unitary injection-molded part, greatly simplifying the production assembly operations.

It is further an object of this invention to provide a ball cock fluid flow control assembly of the foregoing type wherein the filtering of the water flowing therethrough within the water outlet chamber is greatly simplified by a single filtering member eliminating the necessity of separate filtering of the water passing into the refill hose and the water passing circuitously downwardly through the outlet member and ultimately into the tank interior. Instead of directing the water through the valve and then downwardly immediately into the water outlet chamber formed between the water inlet and outlet members, the filtering member is positioned within the outlet chamber and provides as a part of said outlet chamber, a filtering chamber receiving all of the water flow therethrough. Thus, when the water ultimately reaches the major part of the outlet chamber, it has already been filtered and does not require the separate filtering of that portion passing into the refill hose and that portion passing downwardly through the outlet member into the tank interior. The filtering member thereby serves the dual filtering purposes eliminating filtering fingers and slots from the outlet member and permitting the outlet member to be of a relatively simple configuration.

It is also an object of this invention to provide a ball cock fluid flow control assembly having all of the foregoing advantageous attributes and, through the inherent construction thereof, serves to further reduce the noise of water flow therethrough. As pointed out, all of the water inlet, water outlet and valve housing may be formed of plastic so as to eliminate the use of metal therefrom. Thus, the impingement of water against these plastic parts does not create the noise transmission as would be encountered with metal parts of the same configuration.

Other objects and advantages of the invention will be apparent from the following specification and the accompanying drawings which are for the purpose of illustration only.

DESCRIPTION OF THE BEST EMBODIMENT CONTEMPLATED

Figures 1, 2, 3:
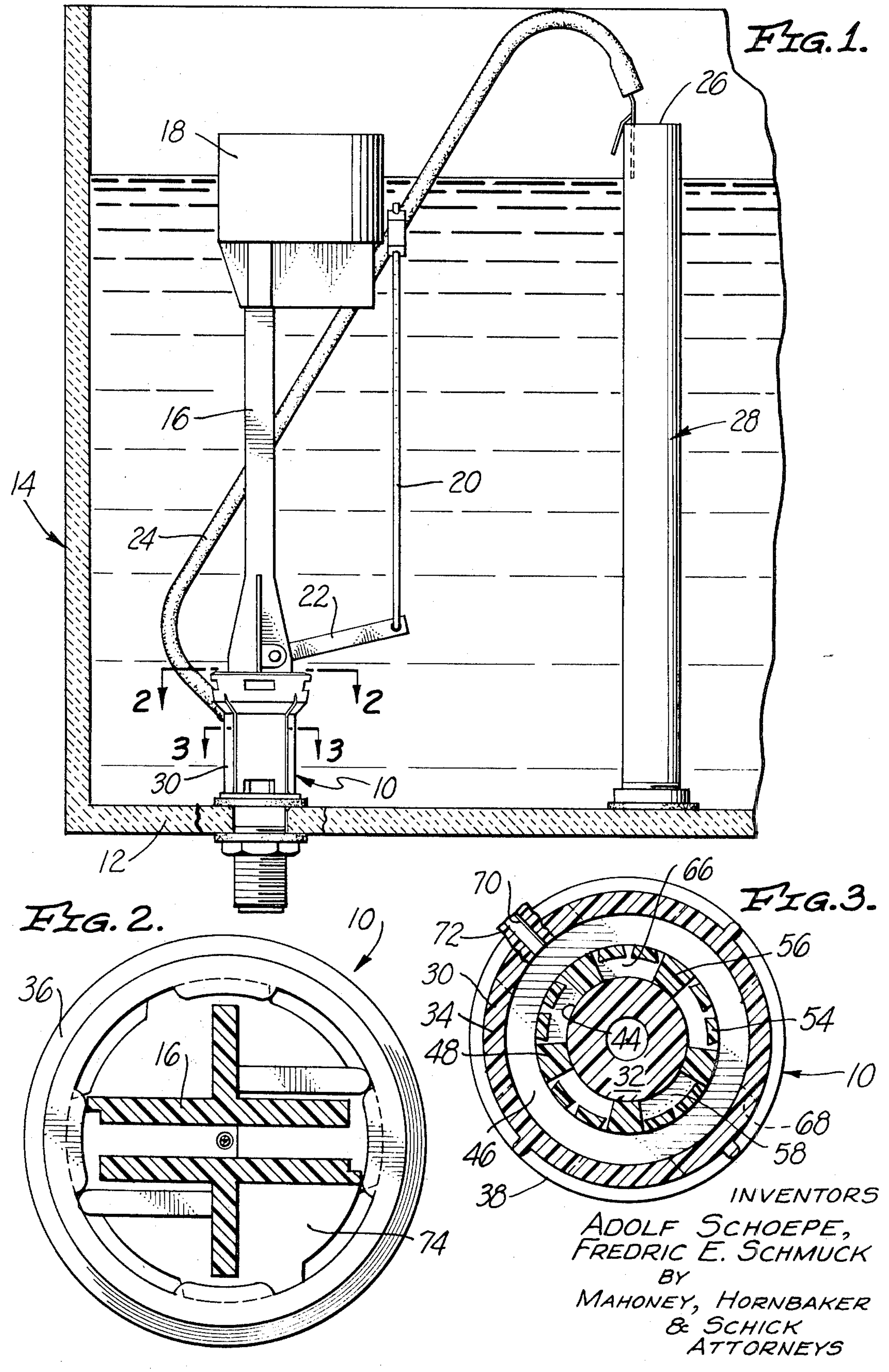
FIG. 1 is a side elevational view of an embodiment of ball cock incorporating the principles of the present invention, said ball cock being mounted in a water or flush tank shown in vertical section with the ball cock refill hose being mounted for directing water into a refill tube.
FIG. 2 is an enlarged, horizontal sectional view looking in the direction of the arrows 2–2 in FIG. 1.
FIG. 3 is an enlarged, horizontal sectional view looking in the direction of the arrows 3–3 in FIG. 1.

Referring to FIG. 1 of the drawings, the embodiment of ball cock incorporating the principles of the present invention includes a lower fluid flow control assembly generally indicated at 10 secured extending through a bottom wall 12 of a usual water or flush tank generally indicated at 14. The ball cock lower assembly 10 supports an upright mast or guide 16 which vertically slidably mounts a float 18 operably connected to the ball cock lower assembly 10 through a connecting arm 20 and a valve-operating lever 22 so that as the water level in the tank 14 drops moving the float downwardly the ball cock lower assembly is opened permitting water to flow therethrough into the tank and a rise in the tank water level closes the ball cock lower assembly sealing off water flow therethrough. During the open position of the ball cock lower assembly 10 and the flow of water therethrough into the interior of the tank 14, a portion of the water flow is directed by the lower assembly into a flexible refill hose 24 and upwardly into an open upper end 26 of a usual refill tube generally indicated at 28.

More particularly to the principles of the present invention, the ball cock lower assembly 10 is formed by a unitary, preferably injection-molded plastic, water flow director 30 comprised of a central water inlet portion 32 and an integral outwardly telescoping water outlet portion 34 having an integral upward extension forming a valve lower housing portion 36. Both the water inlet and outlet portions 32 and 34 are tubular in configuration, the water inlet portion being secured extending through the tank bottom wall 12 connected to a usual supply of water and the overall water flow director 30 being supported at the tank bottom wall on a horizontal flange surface 38 at the lower end of the water inlet portion. The water inlet portion 32 terminates upwardly within the tank interior at the valve lower housing portion 36 in an upper end 40 opening into the valve lower housing portion and forming an annular valve seat 42, with the water outlet portion 34 being spaced outwardly surrounding an outer side 44 of the water inlet portion and forming a water outlet chamber 46 also opening upwardly into the valve lower housing portion but in an annular zone outwardly of the valve seat 42.

A water filter member 48, also preferably formed of plastic by injection molding, is slidably assembled downwardly into the water outlet chamber 46 through the valve lower housing portion 36. The filter member 48 is comprised of an annular upper clamping flange 50 outwardly sealingly engaged with the water outlet portion 34 and forming an upper clamping surface 52 at the valve lower housing portion 36 spaced outwardly of the valve seat 42. The filter member 48 also includes a cylindrical slotted wall 54 extending downwardly along, but spaced outwardly from, the outer side 44 of the water inlet portion 32, engaging said water inlet outer side by a series of circumferentially spaced inward projections 56 adjacent the valve seat 42 and terminating downwardly in a continuous, annular intermediate baffle 58.

Below the intermediate baffle 58, the filter member 48 continues downwardly outwardly abutting and surrounding the inlet portion outer side 44, having a series of circumferentially spaced water flow openings 60 opening inwardly against the inlet portion outer side and communicating downwardly with a series of circumferentially spaced flow slots 62 opening downwardly into a lower portion of the water outlet chamber 46 inwardly of a lower, annular baffle 64 outwardly engaged with the water outlet portion 34. Thus, the filter member 48 outwardly seals the upper end of the water outlet chamber 46 blocking outward flow of water within the valve lower housing portion 36 over the valve seat 42 and forcing the water to flow downwardly into a filtering chamber 66 formed by the filter member adjacent the inlet portion outer side 44 and within or as a part of the water outlet chamber. From the filtering chamber 66, the water is forced to flow and be filtered outwardly through the filter member slotted wall 54 into the main part of the water outlet chamber 46 by the filter member intermediate baffle 58 so that all water entering the main part of the water outlet chamber 46 is subject to such filtering.

At the lower termination of the water outlet chamber 46, an upright annular baffle is formed intermediate the water inlet and outlet portions 32 and 34, and the water outlet portion is provided with a series of circumferentially spaced water outlet slots or openings 68 communicating outwardly with the interior of the water tank 14. Furthermore, spaced below the upward extension forming the valve lower housing portion 36, the water outlet portion 34 is provided with a refill outlet 70 therethrough formed partially by an integral, angularly upwardly projection, refill hose nipple 72. The refill hose nipple 72 is telescoped by an end of the refill hose 24 so that the refill outlet 70 directs a portion of the water within the water outlet chamber 46 into the refill hose and upwardly into the upper end 26 of the refill tube 28 when water is flowing through the water outlet chamber.

Figures 4, 5:
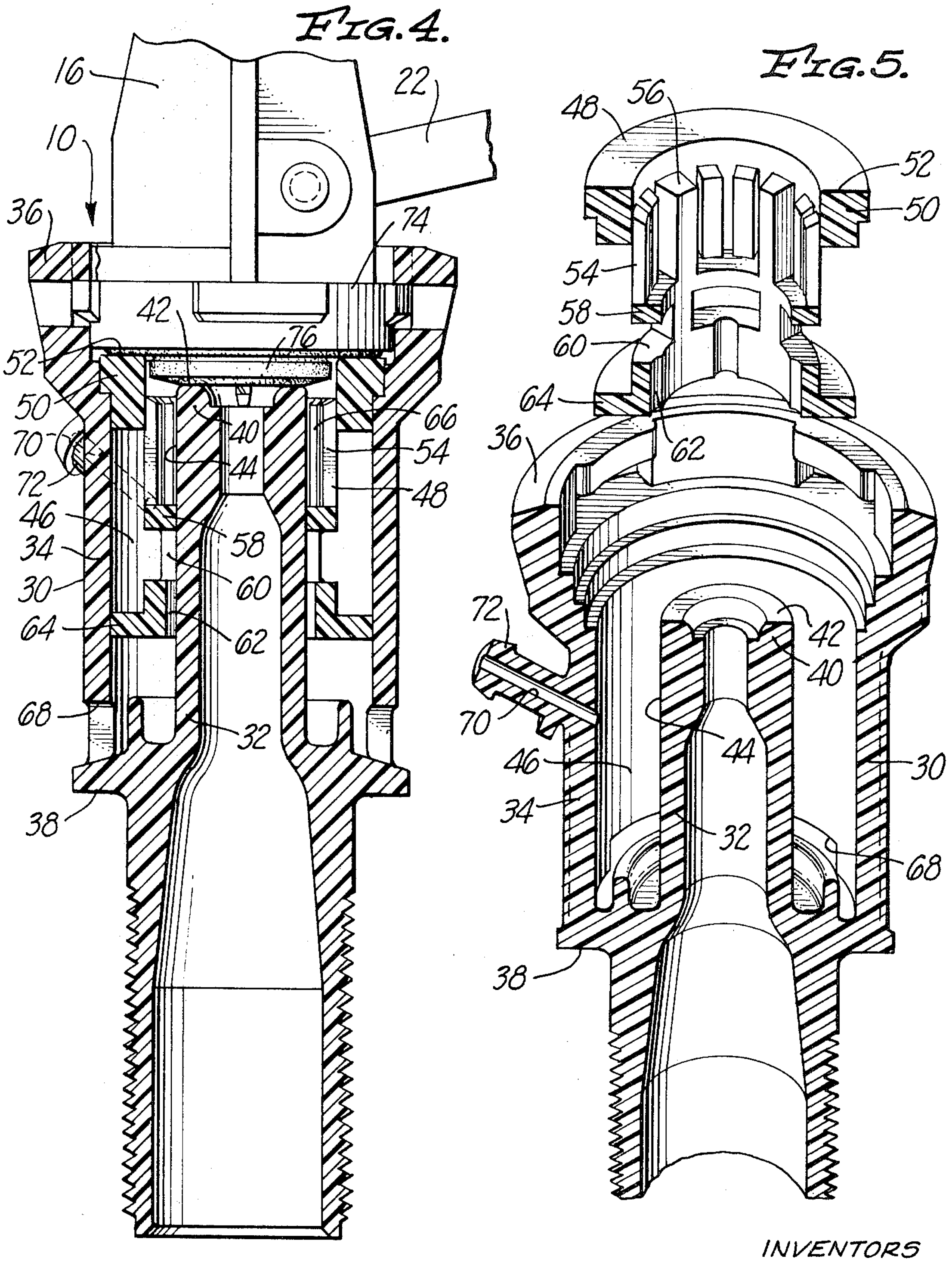
FIG. 4 is an enlarged, fragmentary, vertical sectional view, part in side elevation, showing the details of the fluid flow control assembly of the ball cock of FIG. 1.
FIG. 5 is enlarged, exploded vertical sectional perspective view of a part of the fluid flow control assembly of the ball cock of FIG. 1.

A preferably injection-molded plastic, valve upper housing portion 74 is assembled received downwardly within the valve lower housing portion 36, being bayonet-joint secured therewith and with said lower housing portion enclosing a resilient material sealing member 76. During the assembly of the valve lower and upper housing portions 36 and 74, the valve upper housing portion clamps an outer annular zone of the sealing member 76 downwardly against the filter member clamping surface 52 as shown in FIG. 4, thereby completing the blocking of the water flow over the valve seat 42 and outwardly of the upper open end of the filtering chamber 66. As best seen in FIGS. 2 and 4, the mast 16 is preferably formed integral with the valve upper housing portion 74 with the valve operating lever 22 pivotally mounted thereon and being operably connected controlling the upward and downward movement of the sealing member 76 away from and against the valve seat 42.

In operation of the ball cock of the present invention, therefore, downward movement of the float 18 permitted by a drop in the water level within the water tank 14 pivots the outer end of the valve-operating lever 22 downwardly and permits movement of the valve-sealing member 76 upwardly away from the valve seat 42. Water flows inwardly through the water inlet portion 32 of the water flow director 30, over the valve seat 42 beneath the valve-sealing member 76 and downwardly into the filter member filtering chamber 66. From the filtering chamber 66, the water flows outwardly into the main portion of the water outlet chamber 46 within the water outlet portion 34, it being particularly noted that all of such water flowing into the water outlet chamber is filtered through the slotted wall 54 of the filter member 48.

A portion of the water flowing into the water outlet chamber 46 is passed directly into the refill outlet 70 and the refill hose nipple 72 into the refill hose 24 for ultimate direction into the refill tube 28. The remainder of the water flowing into the water outlet chamber 46 through the filter member 48 is directed circuitously downwardly through the filter member flow openings 60 and flow slots 62, over the lower baffle 64 and outwardly of the water outlet portion 34 through the water outlet openings 68 into the interior of the water tank 14. A rise in the water level of the water tank 14 moves the float 18 upwardly pivoting the outer end of the valve-operating lever 22 upwardly and ultimately moving the valve-sealing member 76 downwardly against and sealing over the valve seat 42, thereby sealing off the flow of water from the water inlet portion 32 of the water flow director 30.

According to the present invention, therefore, a ball cock is provided having an improved fluid flow control assembly thereon in the form of the water flow director 30 which is highly corrosion resistant due to the major parts thereof being formed of plastic so as to be adapted for use with the more corrosive waters such as sea water. Furthermore, the water flow director 30 is of a greatly simplified form, having the water inlet portion 32 thereof, the water outlet portion 34 thereof and the valve lower housing portion 36 thereof all formed as a unitary assembly, with a single filter member 48 being slidably assembled therewith and serving the dual purpose of filtering all of the water flow through the assembly and the major part of the circuitous water direction through the assembly. Still further, the single filter member 48 performs an added function with or as a part of the valve lower housing portion 36 of outward clamping and sealing of the valve-resilient and movable sealing member 76, said sealing member also resisting corrosion by being formed of a resilient plastic material.

Still in addition to all of the foregoing advantageous features, the water flow director 30 of the ball cock of the present invention serves to reduce the flow noise of the water flowing through the water flow director. By the provision of all the major parts thereof of plastic, metal surfaces are completely eliminated with noise-deadening plastic surfaces replacing the same. Thus, the plastic elements of the ball cock water flow director 30 not only provide the corrosion-resistant qualities, but also the noise-reducing qualities, highly desirable in ball cocks of the type herein involved.

We claim:

1. In a ball cock for controlling the flow of water into and the water level within a water tank, the combination of: a unitary water flow unit including a water inlet portion and a water outlet portion and at least a major part of a valve lower housing portion, said water outlet portion telescoping said water inlet portion and forming an annular water outlet chamber therebetween opening into said valve lower housing portion, said valve lower housing portion being formed as an integral extension of said water outlet portion, said water inlet portion opening in direction of water flow into said valve lower housing portion and having an end at said valve lower housing portion forming an annular valve seat, water outlet opening means through said water outlet portion communicating between said water outlet chamber and an interior of said tank; valve means actionable between open and closed positions including said valve lower housing portion and an upper housing portion assembled enclosing a sealing member mounted movable against and away from said annular valve seat at said water inlet portion end sealing water flow between said water inlet portion and said water outlet chamber in said valve-closed position and permitting said water flow in said valve-open position, said valve means being operably connected to control means for actuating said valve means between said open and closed positions; and an annular unitary filtering member positioned in said outlet chamber surrounding said water inlet member forming an inner part of said outlet chamber as a filtering chamber around said water inlet portion and segregated from an outer part of said outlet chamber, said filtering chamber opening upwardly into said lower housing portion outwardly of said valve seat and being closed spaced downwardly by said filtering member and communicating outwardly with said outlet chamber outer part through a series of spaced slots formed in said filtering member, said filtering member having an upper outer annular end part at said valve lower housing portion spaced outwardly of said valve seat at said water inlet portion end and outwardly bordering said filtering chamber upward opening clamping an outer annular part of said valve means sealing member and blocking the flow of water outwardly of said valve seat into said outlet chamber other than through said filtering chamber upward opening and through said filtering chamber.

2. A ball cock as defined in claim 1 in which said water flow unit is a unitary molded plastic assembly forming said water inlet portion and said water outlet portion and said major part of said valve lower housing portion; and in which said annular unitary filtering member is an annular plastic filtering member.

3. In a ball cock for controlling the flow of water and the water level within a water tank, the combination of: a unitary water flow director including a tubular water outlet portion having at least a part of a valve lower housing portion as an end extension thereof and telescoping a tubular water inlet portion having an end opening in a direction of water flow into said valve lower housing portion, said water inlet portion end forming an annular valve seat thereover, said water inlet and outlet portions forming a water outlet chamber therebetween outwardly of said water inlet portion opening in a reverse direction from said water flow direction into said valve lower housing portion and opening in said water flow direction into a tank interior spaced from said valve lower housing portion; valve means actionable between open and closed positions including said valve lower housing portion and an upper housing portion assembled enclosing a sealing member mounted movable against and away from said annular valve seat at said water inlet portion end sealing water flow between said water inlet portion and permitting said water flow in said valve-open position, said valve means being operably connected to control means for actuating said valve means between said open and closed positions; and an annular unitary filtering member positioned in said water outlet chamber telescoping said water inlet portion and telescoped by said water outlet portion forming an inner part of said outlet chamber as an annular filtering chamber surrounding and against said water inlet member segregated from an outer part of said outlet chamber and opening in said reverse water flow direction into said valve lower housing portion outwardly adjacent said valve seat, said filtering chamber being formed by said filtering member communicating solely from said valve lower housing portion outwardly with said outlet chamber outer part through a series of spaced slots formed in said filtering member, said filtering member terminating in said reverse water flow direction at said valve lower housing portion in an annular end surface spaced outwardly of said water inlet portion valve seat clamping an annular zone of said valve means sealing member, said filtering member annular end surface outwardly abutting said water outlet portion and blocking the flow of water outwardly of said valve seat into said outlet chamber other than through said filtering chamber.

4. A ball cock as defined in claim 3 in which said water flow director is a molded plastic integral assembly; in which said upper housing portion of said valve means is a molded plastic member; in which said valve means sealing member is a resilient material sealing member; and in which said annular unitary filtering member is an annular molded plastic filtering member member.